United States Patent
Akitaya

(10) Patent No.: US 6,542,323 B1
(45) Date of Patent: Apr. 1, 2003

(54) TAPE-THICKNESS MEASURING METHOD, AND TAPE-RUNNING CONTROL METHOD USING THE TAPE-THICKNESS MEASURING METHOD

(75) Inventor: Masato Akitaya, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/568,314

(22) Filed: May 9, 2000

Related U.S. Application Data

(62) Division of application No. 09/211,359, filed on Dec. 14, 1998, now Pat. No. 6,079,652.

(30) Foreign Application Priority Data

Dec. 16, 1997 (JP) .............................................. 9-346786

(51) Int. Cl.$^7$ .............................................. G11B 15/46

(52) U.S. Cl. .................... 360/73.04; 360/74.2; 360/96.1

(58) Field of Search .............................. 360/73.04, 137, 360/71, 72.3, 73.02, 73.03, 85, 90, 96.1, 74.2

(56) References Cited

U.S. PATENT DOCUMENTS

| | | | |
|---|---|---|---|
| 4,280,159 A | * 7/1981 | Nakayama | 360/137 |
| 4,335,439 A | * 6/1982 | St. Denis | 700/173 |
| 4,338,645 A | * 7/1982 | Mohri et al. | 360/137 |
| 4,478,376 A | * 10/1984 | Sakaguchi et al. | 242/334.1 |
| 4,516,740 A | * 5/1985 | Yoshino et al. | 242/334.3 |
| 5,136,526 A | * 8/1992 | Baur et al. | 702/163 |
| 5,803,387 A | * 9/1998 | Mace | 242/333.6 |
| 5,867,354 A | * 2/1999 | Kuchar | 360/137 |
| 6,079,652 A | * 6/2000 | Akitaya | 242/334.4 |

* cited by examiner

Primary Examiner—David Hudspeth
Assistant Examiner—Fred F. Tzeng
(74) Attorney, Agent, or Firm—Ladas & Parry

(57) ABSTRACT

A tape running control method in which a tape runs between a supply reel and a take-up reel, and a rotation speed of said take-up reel is controlled by using rotation periods of said supply reel and said take-up reel, whereby a running speed of said tape is controlled. The method comprises the steps of detecting a thickness of said tape; calculating a predetermined total tape wound amount by using the detected thickness of said tape; and controlling the rotation speed of said take-up reel by using the thus-calculated total tape wound amount.

3 Claims, 8 Drawing Sheets

TAPE-THICKNESS MEASURING METHOD, AND TAPE-RUNNING CONTROL METHOD USING THE TAPE-THICKNESS MEASURING METHOD

This application is a division of U.S. Ser. No. 09/211,359 filed Dec. 14, 1998, now U.S. Pat. No. 6,079,653 which U.S. application is hereby incorporated herein by reference.

BACKGROUND OF THE INVENTION

1. Field of the Invention

The present invention relates to a tape-thickness measuring method, and a tape-running control method using the tape-thickness measuring method. In particular, the present invention relates to a tape-thickness measuring method in which a belt-type recording medium is caused to run at a fixed speed, and a tape-running control method using the tape-thickness measuring method.

2. Description of the Related Art

A DDS (Digital Data Storage) has been developed as a large-capacity data backing-up device. In the DDS, backup data is recorded in a recording format of a DAT (Digital Audio Tape-recorder). In the DAT, a magnetic tape is caused to run at a fixed speed, data is recorded on the magnetic tape, and, also, data is reproduced from the magnetic tape. A belt-type recording medium such as a magnetic tape has a capacity larger than that of a disk-type recording medium. Therefore, when a large amount of data should be backed up, the DDS is useful.

FIG. 1 shows a general arrangement of one example of DDS in the related art.

In the DDS in the related art, when data is recorded or reproduced, a magnetic tape 3 contained in a DAT tape cassette 2 is drawn out from a supply reel 4, is caused to run through supply poles 5 and a guide roller 6, and is wound on a rotation drum 7 through a predetermined angle. Then, the magnetic tape 3 is caused to run through take-up poles 8 and a guide roller 9, and is drawn into a take-up reel 10 of the DAT tape cassette 2.

At this time, the magnetic tape 3 is sandwiched by a capstan shaft 11*a* rotated by a capstan motor 11 and a pinch roller 12 on the side of the take-up reel 10, and is caused to run at a fixed speed as a result of being driven by the rotating capstan shaft 11*a*.

At this time, the running speed of the magnetic tape 2 is determined by the rotation speed of the capstan shaft 11*a*, that is, the rotation speed of the capstan motor 11. Therefore, in order to make the running speed of the magnetic tape 2 be fixed, the rotation speed of the capstan motor 11 is maintained to be fixed.

For this purpose, an FG (Frequency Generator) 13 is attached to the capstan motor 11, the rotation of the capstan motor 11 is detected through the FG 13, and the rotation speed of the capstan motor 11 is fixed by servo control. Thereby, the running speed of the magnetic tape 2 is maintained to be fixed.

However, in the DDS system 1 in the related art shown in FIG. 1, the running speed of the magnetic tape is maintained to be fixed as a result of servo control being performed on the capstan motor 11. In such a system, it is necessary that the magnetic tape 3 be sandwiched by the capstan shaft 11*a* and the pinch roller 12. Therefore, because the tape thickness is reduced as high-density data storage is achieved, the tape may be damaged.

A magnetic recording and reproducing apparatus in a capstan-less system has been proposed, in which apparatus the take-up reel is rotated by a reel motor, and, as a result of rotating the take-up reel so that the running speed of the magnetic tape is fixed, the capstan motor is omitted.

As such a magnetic recording and reproducing apparatus in the capstan-less system, a magnetic recording and reproducing apparatus is disclosed by Japanese Laid-Open Patent Application No. 9-500477, for example.

In the magnetic recording and reproducing apparatus disclosed in Japanese Laid-Open Patent Application No. 9-500477, in accordance with servo information previously written in a magnetic tape, the rotation of a take-up reel is controlled by a reel motor so that the running speed of the magnetic tape is fixed. In the magnetic recording and reproducing apparatus disclosed in Japanese Laid-Open Patent Application No. 9-500477, it is necessary to write special servo information on the magnetic tape. Therefore, it is not possible to reproduce data from a magnetic tape on which such special servo information is not recorded.

Therefore, a magnetic recording and reproducing apparatus has been proposed in which the running speed of a magnetic tape is detected by using an encoder, and the rotation speed of a take-up reel is controlled by a reel motor by using the thus-detected tape running speed.

FIG. 2 shows a block diagram of another example of a magnetic recording and reproducing apparatus in the related art. In the FIG., the same reference numerals are given to the parts the same as those shown in FIG. 1, and descriptions thereof will be omitted.

In the magnetic recording and reproducing apparatus 100, an encoder 101 is provided instead of a capstan shaft. The running speed of the magnetic tape 3 is detected in accordance with the rotation of the encoder 101. A detection signal produced by the encoder 101 is provided to a control circuit 102.

The control circuit 102 controls the rotation speed of a reel motor 103, which rotates a take-up reel 10, by using the detection signal.

The take-up reel 10 is driven by the reel motor 103 and fixes the speed at which the magnetic tape 3 is taken up by the take-up reel 10, thus maintaining the running speed of the magnetic tape 3 to be fixed.

In a magnetic recording and reproducing apparatus in which a tape running speed is detected by an encoder or the like, and rotation of a take-up reel is controlled by a reel motor by using the detected running speed of a magnetic tape, it is necessary to provide an encoder or the like instead of a capstan motor. Thereby, miniaturization of the magnetic recording and reproducing apparatus cannot be achieved, and, also, because the encoder is expensive, cost reduction of the magnetic recording and reproducing apparatus cannot be achieved.

Further, an encoder shaft, which is rotated by the magnetic tape and rotates the encoder, is in contact with the magnetic tape, and is rotated by using a friction force. Thus, the encoder detects the running speed of the magnetic tape. Therefore, when the magnetic tape slides on the encoder shaft, an error occurs between the actual running speed of the magnetic tape and the detection signal of the encoder. Thereby, it is not possible to precisely control the running speed of the magnetic tape.

Therefore, the applicant of the present application proposed, in Japanese Patent Application No. 9-262430, a tape running method, in which tape running is controlled only by using the rotation periods of a supply reel and a take-up reel.

In the magnetic recording and reproducing apparatus in the related art in which the running speed of the magnetic tape is fixed by the capstan motor, because it is necessary to provide the capstan motor, pinch roller and so forth, miniaturization and cost reduction cannot be achieved. Further, the magnetic tape, the thickness of which is reduced, may be damaged.

In the magnetic recording and reproducing apparatus disclosed in Japanese Laid-Open Patent Application No. 9-500477, the rotation of the take-up reel is controlled by the reel motor, so that the running speed of the magnetic tape is fixed, by using the servo information previously written on the magnetic tape. Therefore, recording or reproducing cannot be performed on the magnetic tape on which the servo information has not been written.

In the magnetic recording and reproducing apparatus in which the running speed of the magnetic tape is detected through the encoder-or the like, and the rotation of the take-up reel is controlled by the reel motor by using the detected tape running speed, because it is necessary to provide the encoder or the like instead of a capstan motor, miniaturization of the apparatus cannot be achieved, and, also, because the encoder is very expensive, cost reduction of the apparatus cannot be achieved.

Further, the encoder shaft, which is rotated by the magnetic tape and rotates the encoder, is in contact with the magnetic tape, and is rotated by using a friction force. Thus, the encoder detects the running speed of the magnetic tape. Therefore, when the magnetic tape slides on the encoder shaft, an error occurs between the actual running speed of the magnetic tape and the detection signal of the encoder. Thereby, it is not possible to precisely control the running speed of the magnetic tape.

In the magnetic recording and reproducing apparatus proposed by the applicant of the present application in the Japanese Patent Application No. 9-262430, because the running speed of the magnetic tape is controlled only by using the rotation periods of the supply reel and the take-up reel, when a system in which the tape is taken up 1000 through 2000 turns is considered, the maximum diameters of reels vary due to variation in the tape thickness. When the maximum diameters of reels vary, variation in the rotation periods of the supply reel and the take-up reel occur. As a result, the tape running speed varies, and, thereby, the tape running cannot be controlled precisely.

SUMMARY OF THE INVENTION

The present invention is directed to eliminating the above-mentioned problems. An object of the present invention is to provide a tape-thickness measuring method by which the tape thickness can be easily measured from the rotation periods of reels and the tape running can be controlled precisely, and a tape-running control method using the tape-thickness measuring method.

A tape-thickness measuring method, according to the present invention, used in a tape running apparatus in which a tape runs between a supply reel and a take-up reel, comprises the steps of:

detecting rotation periods of the supply reel and the take-up reel when the take-up reel has rotated predetermined numbers of revolutions;

calculating a number of turns of the tape remaining on the supply reel by using the thus-detected rotation periods; and calculating a thickness of the tape by using the thus-calculated number of turns of the tape remaining on the supply reel.

The tape-thickness measuring method may comprise the steps of:

calculating a ratio between the rotation periods of the supply reel and the take-up reel detected when the take-up reel has rotated a predetermined first number of revolutions;

calculating a ratio between the rotation periods of the supply reel and the take-up reel detected when the take-up reel has rotated a predetermined second number of revolutions;

obtaining a difference between a number of revolutions which the supply reel has rotated when the take-up reel has rotated the predetermined first number of revolutions and a number of revolutions which the supply reel has rotated when the take-up reel has rotated the predetermined second number of revolutions;

calculating the number of turns of the tape remaining on the supply reel by using the thus-calculated ratios between the rotation periods and the thus-obtained difference; and calculating the thickness of the tape by using the thus-calculated number of turns of the tape remaining on the supply reel.

Specifically, the thickness of the tape is calculated as follows:

The diameter (mm) of a supply-reel hub and a take-up-reel hub is represented by 'd,' the thickness (mm) of the tape is represented by 't,' the running speed (mm/sec) of the tape is represented by 'V,' the number of turns of the tape wound on the supply reel hub is represented by Ns, the number of turns of the tape wound on the take-up reel hub is represented by Nt, the diameter (mm) of the tape-wound supply-reel hub is represented by øs and the diameter (mm) of the tape-wound take-up-reel hub is represented by øt.

Then, the diameter øs of the tape-wound supply-reel hub can be expressed as follows:

$$øs = d + 2 \cdot Ns \cdot t \text{ (mm)} \tag{1}$$

The diameter øt of the tape-wound take-up-reel hub can be expressed as follows:

$$øt = d + 2 \cdot Nt \cdot t \text{ (mm)} \tag{2}$$

The rotation period Ts of the supply reel and the rotation period Tt of the take-up reel can be expressed as follows:

$$Ts = (øs \cdot \pi)/V \text{ (sec)} \tag{3}$$

$$Tt = (øt \cdot \pi)/V \text{ (sec)} \tag{4}$$

From the above equations (1) through (4), the ratio between the rotation periods Ts, Tt of the supply reel and the take-up reel can be expressed as follows:

$$Ts/Tt = øs/øt = (d + 2 \cdot Ns \cdot t)/(d + 2 \cdot Nt \cdot t) \tag{5}$$

From the above equation (5), the thickness 't' of the tape can be expressed as follows:

$$t = (d/2) \cdot (k-1)/(Ns - k - Nt) \tag{6}$$

In the above equation, k=Ts/Tt.

In the above equation, although the number Nt of turns of the tape wound on the take-up-reel hub can be obtained as result of the number of revolutions which the take-up reel has rotated being counted since the tape started being wound on the take-up-reel hub, the number Ns of turns of the tape remaining on the supply-reel hub is the unknown.

When the take-up reel has rotated a predetermined number 'A' of revolutions since the tape started being wound on the take-up reel hub, the equation (6) is expressed as follows:

$$t=(d/2)\cdot(ka-1)/(Nsa-ka\cdot A) \qquad (7)$$

In the above equation, Nsa represents the number of turns of the tape remaining on the supply-reel hub, and ka represents the ratio between the rotation periods of the supply reel and the take-up reel, at this time.

Then, when the take-up reel has rotated a predetermined number 'x' of revolutions after rotating the predetermined number 'A' of revolutions, and, thereby, the number 'z' of turns of the tape has been reduced from the supply-reel hub, the number of turns of the tape remaining on the supply-reel is (Nsa−z), and the equation (6) can be expressed as follows:

$$t=(d/2)-(kax-1)/\{(Nsa-z)-kax\cdot(A+x)\} \qquad (8)$$

In the above equation, kax represents the ratio between the rotation periods of the supply reel and the take-up reel at this time.

From the equations (7) and (8), $$(d/2)\cdot(ka-1)/(Nsa-ka-A)=(d/2)\cdot(kax-1)/\{(Nsa-z)-kax\cdot(A+x)\} \qquad (9)$$

From the equation (9), the number Nsa of turns of the tape remaining on the supply-reel hub can be obtained as follows:

$$Nsa=\{ka\cdot(A+z+x\cdot kax)-kax\cdot(A+x)-z\}/(ka-kax) \qquad (10)$$

The number Nsa of turns of the tape remaining on the supply-reel hub, which was the unknown, can be obtained by the equation (10). As a result of substituting the thus-obtained number Nsa in the equation (7), the thickness 't' of the tape can be obtained.

Thus, from the rotation periods of the supply reel and the take-up reel, the thickness 't' of the tape can be obtained. As a result, without using special means, the measurement of the thickness of the tape can be performed easily each time when a tape cassette is loaded.

A tape running control method, according to the present invention, in which a tape runs between a supply reel and a take-up reel, and a rotation speed of the take-up reel is controlled by using rotation periods of the supply reel and the take-up reel, and, thereby, a running speed of the tape is controlled, comprises the steps of:

detecting a thickness of the tape;

calculating a predetermined total tape wound amount by using the detected thickness of the tape; and controlling the rotation speed of the take-up reel by using the thus-calculated total tape wound amount.

In this method, because the predetermined total tape wound amount is calculated by using the thickness of the tape, and, then, the rotation speed of the take-up reel is controlled by using the thus-calculated total tape wound amount, the rotation speed of the take-up reel can be controlled in response to variation in the thickness of the tape. Therefore, precise control of the running speed of the tape can be performed irrespective of the thickness of the tape.

The step of detecting the thickness of the tape may comprise the steps of:

detecting rotation periods of the supply reel and the take-up reel when the take-up reel has rotated predetermined numbers of revolutions;

calculating a number of turns of the tape remaining on the supply reel by using the thus-detected rotation periods; and calculating the thickness of the tape by using the thus-calculated number of turns of the tape remaining on the supply reel.

Further, the step of detecting the thickness of the tape may comprise the steps of:

calculating a ratio between the rotation periods of the supply reel and the take-up reel detected when the take-up reel has rotated a predetermined first number of revolutions;

calculating a ratio between the rotation periods of the supply reel and the take-up reel detected when the take-up reel has rotated a predetermined second number of revolutions;

obtaining a difference between a number of revolutions which the supply reel has rotated when the take-up.reel has rotated the predetermined first number of revolutions and a number of revolutions which the supply reel has rotated when the take-up reel has rotated the predetermined second number of revolutions;

calculating the number of turns of the tape remaining on the supply reel by using the thus-calculated ratios between the rotation periods and the thus-obtained difference; and calculating the thickness of the tape using the thus-calculated the number of turns of the tape remaining on the supply reel.

In this method, it is possible to obtain the thickness of the tape from the rotation periods of the supply reel and the take-up reel. As a result, without using special means, the measurement of the thickness of the tape can be performed easily each time when a tape cassette is loaded. As a result, precise control of the running speed of the tape can be performed.

Other objects and further features of the present invention will become more apparent from the following detailed description when read in conjunction with the accompanying drawings.

DETAILED DESCRIPTION OF THE PREFERRED EMBODIMENT

Figure 1:
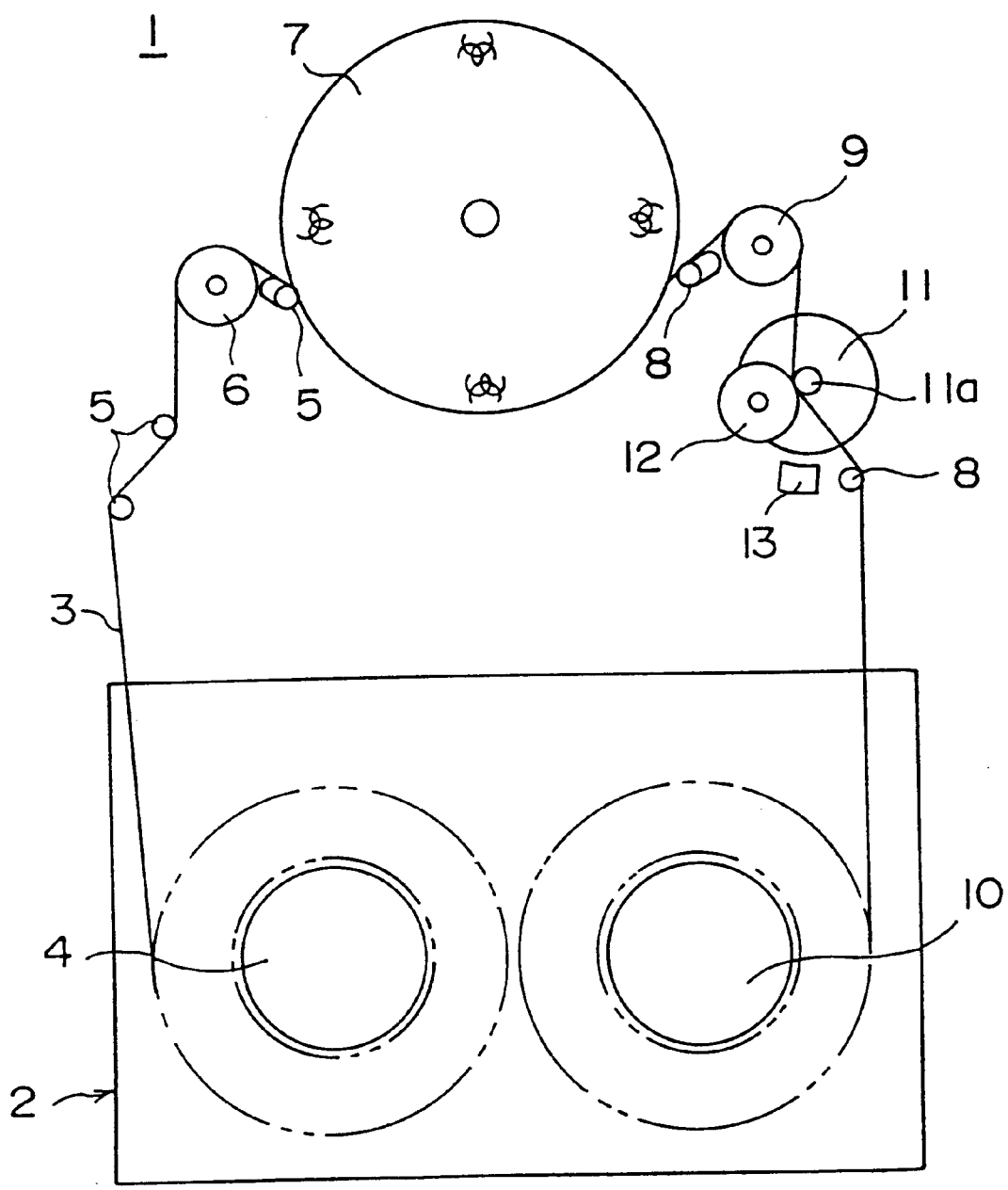
FIG. 1 shows a general arrangement of an example of the related art.
Figure 2:
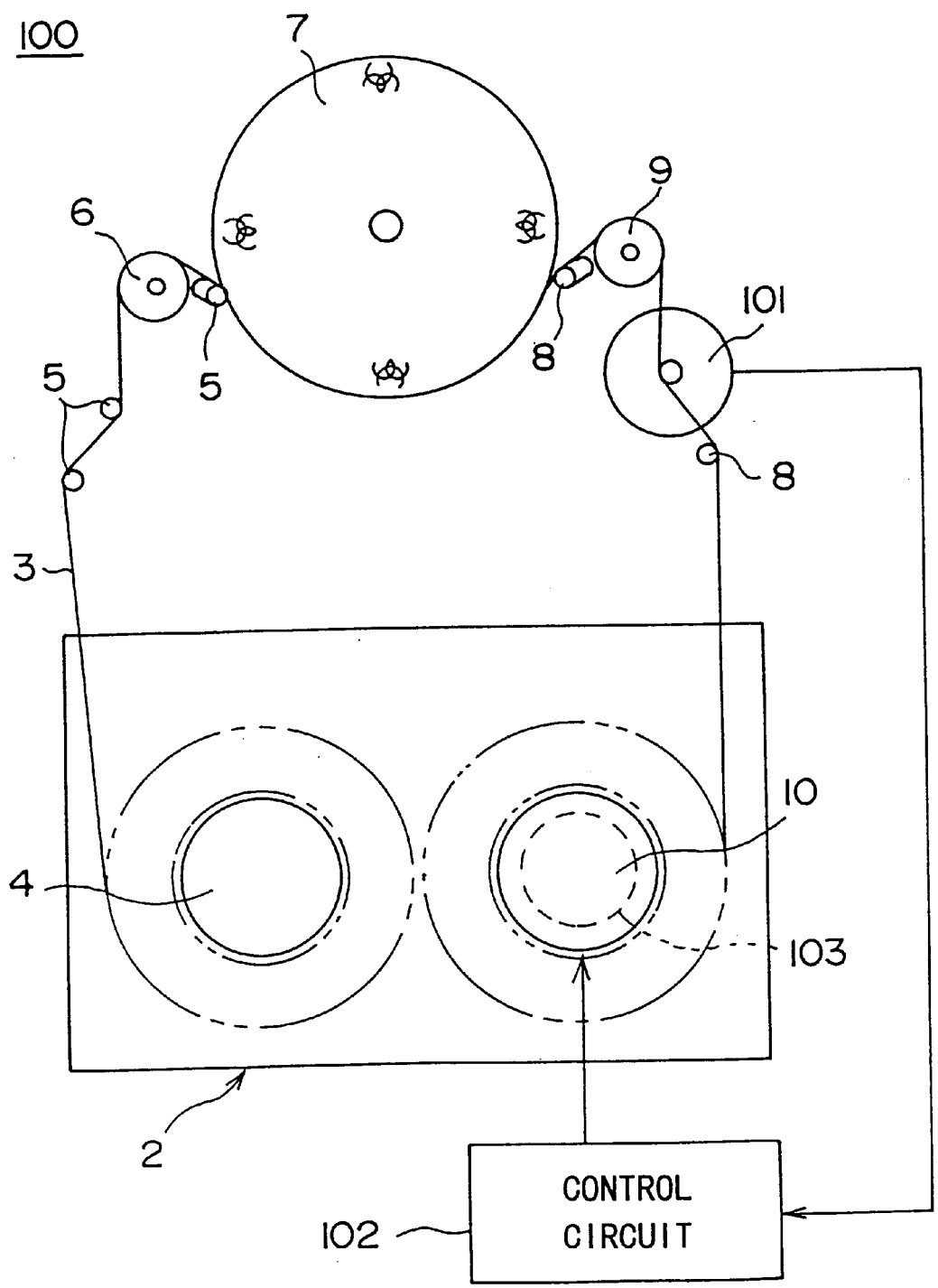
FIG. 2 shows a general arrangement of another example of the related art.
Figure 3:
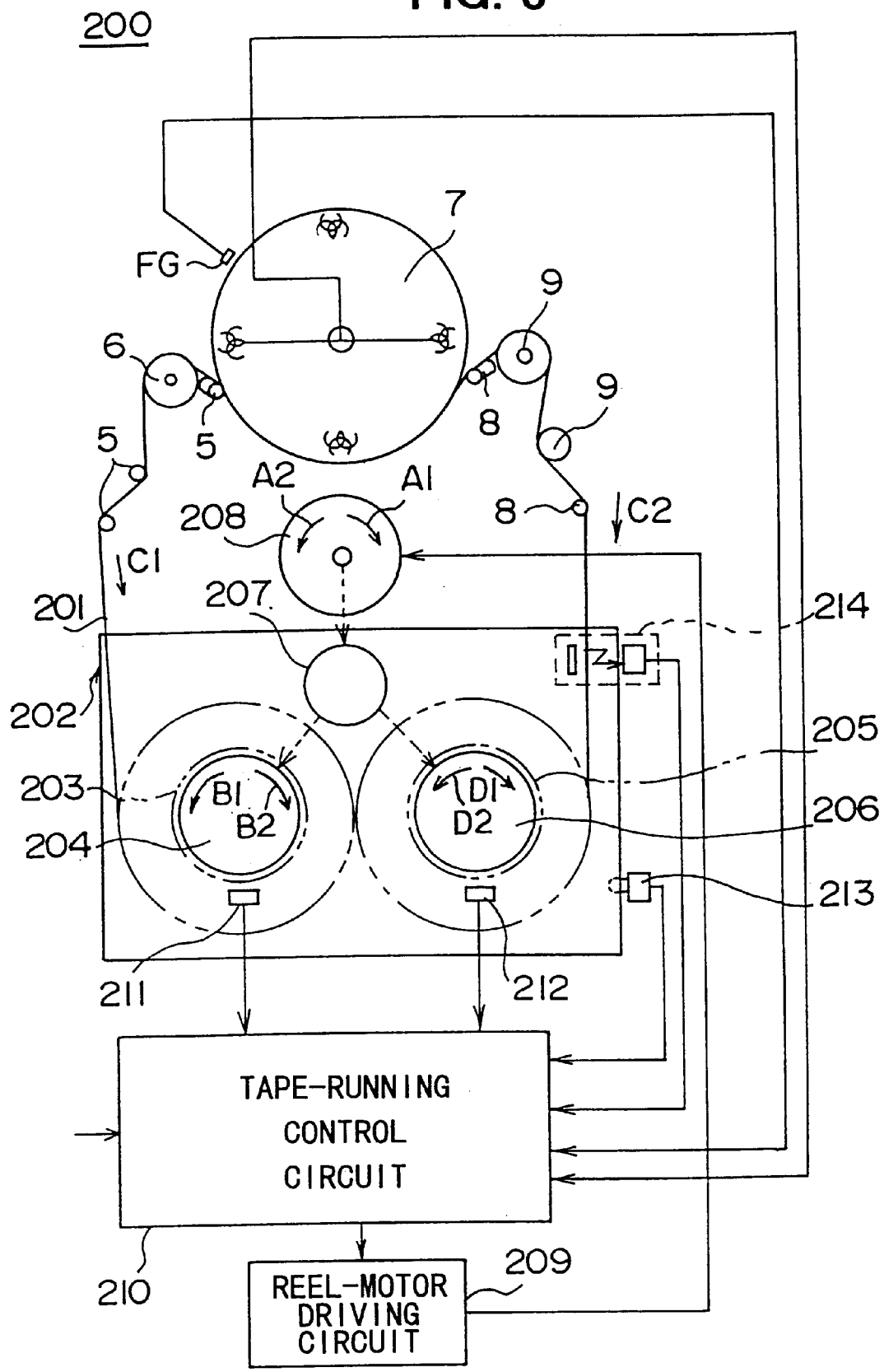
FIG. 3 shows a general arrangement of one embodiment of the present invention.

FIG. 3 shows a general arrangement of one embodiment of the present invention. In the FIG., the same reference numerals are given to those parts the same as the parts shown in FIG. 2, and the description thereof will be omitted.

In a magnetic recording and reproducing apparatus 200, a tape cassette 202 which contains a magnetic tape 201 is loaded at a predetermined loading position. In the tape cassette 202, loaded at the predetermined loading position, a supply-reel hub 203 is engaged with a supply reel 204, and a take-up-reel hub 205 is engaged with a take-up reel 206. As a result, when the supply reel 204 rotates, the supply-reel hub 203 rotates integrally with the supply reel 204, and, when the take-up reel 206 rotates, the take-up-reel hub 205 rotates integrally with the take-up reel 206.

Either the supply reel 204 or the take-up reel 206 is coupled with a reel motor 208 via a swing gear mechanism 207, and one of these reels is rotated selectively in accordance with the rotation of the reel motor 208. The swing gear mechanism 207 selects one of these reels, to which a rotation driving force of the reel motor 208 is transmitted, in accordance with a rotation direction (an arrow-A1 direction or an arrow-A2 direction) of the reel motor 208.

For example, when the reel motor 208 rotates in the arrow-A1 direction, the reel motor 208 is engaged with the supply reel 204, and the rotation driving force of the reel motor 208 is transmitted to the supply reel 204. When the reel motor 208 rotates in the arrow-A2 direction, the reel motor 208 is engaged with the take-up reel 206, and the rotation driving force of the reel motor 208 is transmitted to the take-up reel 206. The supply reel 204 or the take-up reel 206 is rotated in accordance with a rotation speed of the reel motor 208, and running of the magnetic tape 201 is controlled.

The reel motor 208 is connected with a reel-motor driving circuit 209, and rotates in accordance with a driving signal from the reel-motor driving circuit 209. The reel-motor driving circuit 209 is connected with a tape-running control circuit 210, generates the driving signal in accordance with a tape-running control signal supplied by the tape-running control circuit 210, and provides the driving signal to the reel motor 208.

A rotation detecting sensor 211 which detects the rotation of the supply reel 204, a rotation detecting sensor 212 which detects the rotation of the take-up reel 206; a cassette-insertion detecting switch 213 which detects insertion of the tape cassette 202, and a tape-end detecting sensor 214 which detects a front end and a rear end of the magnetic tape 201 are connected to the tape-running control circuit 210. When the insertion of the tape cassette 202 is detected by the cassette-insertion detecting switch 213, the tape-running control circuit 210 causes the magnetic tape 201 contained in the tape cassette 202 to run from the front end to the rear end. At this time, the tape-running control circuit 210 measures a thickness of the tape 201, and, also, detects a total number of revolutions of the take-up reel 206. Then, the tape-running control circuit 210 generates the tape-running control signal, for controlling the rotation of the reel motor 208, by using the detected thickness of the tape 201, the total number or revolutions of the take-up reel 206, and a ratio between rotation periods of the supply reel 204 and the take-up reel 206 when the magnetic tape 201 is running.

Operations of the tape-running control circuit 210 when the tape cassette 202 is inserted into the magnetic recording and reproducing apparatus 200 will now be described.

Figure 4:
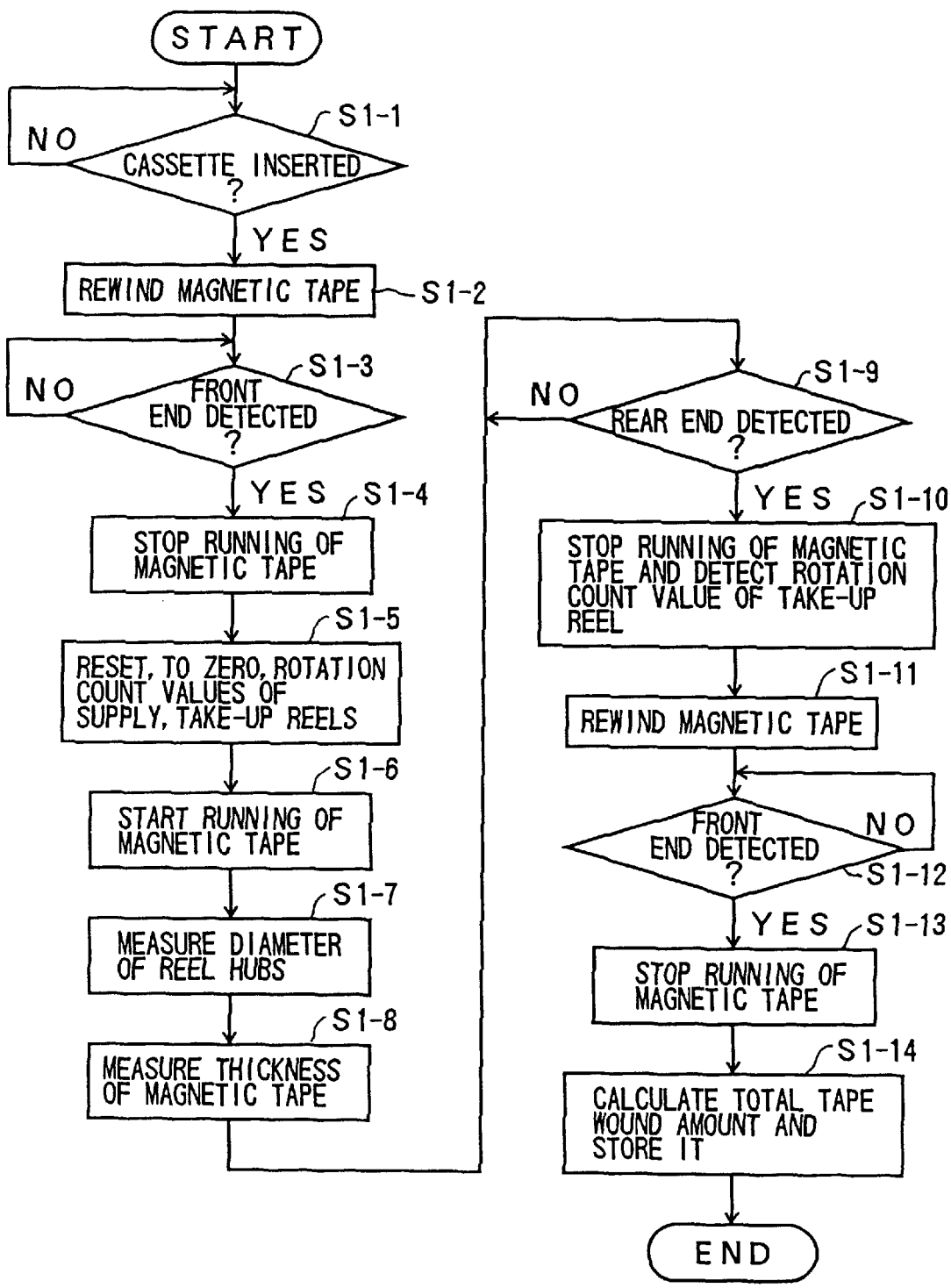
FIG. 4 shows an operation flowchart at the time of insertion of a tape cassette performed by a tape-running control circuit in the embodiment of the present invention.

FIG. 4, shows an operation flowchart performed by the tape-running control circuit 210 in the embodiment of the present invention.

When the cassette-insertion detecting switch 213 detects that the tape cassette 202 has been loaded at the predetermined loading position (in a step S1-1), the tape-running control circuit 210 sends instructions to the reel-motor driving circuit 209 for rewinding the magnetic tape 201 at high speed (in a step S1-2).

When the tape-running control circuit 210 sends instructions to the reel-motor driving circuit 209 for rewinding the magnetic tape 201 at high speed in the step S1-2, the reel-motor driving circuit 209 rotates the reel motor 208 in the arrow-A1 direction at high speed. As a result of the reel motor 208 being rotated in the arrow-A1 direction at high speed, the swing gear mechanism 207 is coupled with the supply reel 204, the supply reel 204 is rotated in an arrow-B1 direction at high speed, and the supply-reel hub 203 of the tape cassette 202 is rotated in the arrow-B1 direction at high speed.

When the supply-reel hub 203 of the tape cassette 202 is rotated in the arrow-B1 direction at high speed, the magnetic tape 201 is wound on the supply-reel hub 203, and the magnetic tape 201 runs in an arrow-C1 direction at high speed. When the magnetic tape 201 has been rewound to the front end thereof, the tape-end detecting sensor 214 detects the front end of the magnetic tape 201.

When the tape-end detecting sensor 214 detects the front end of the magnetic tape 201 (in a step S1-3), the tape-running control circuit 210 sends instructions to the reel-motor driving circuit 209 for stopping running of the magnetic tape 201 and, thereby, the running of the magnetic tape 201 is stopped (at a step S1-4). At this time, the magnetic tape 201 is not wound on the take-up-reel hub 205.

Then, the tape-running control circuit 210 resets, to zero, a count value of rotation pulses supplied by the rotation detecting sensor 211 which detects the rotation of the supply reel 204 and a count value of rotation pulses supplied by the rotation detecting sensor 212 which detects the rotation of the take-up reel 206 (in a step S1-5).

After resetting the count values of the rotation pulses of the supply reel 204 and the take-up reel 206 in the step S1-5, the tape-running control circuit 210 sends instructions to the reel-motor driving circuit 209 for causing the magnetic tape 201 to run at high speed (fast feeding) (in a step S1-6).

When the tape-running control circuit 210 sends the fast-feeding instructions to the reel-motor driving circuit 209 in the step S1-6, the reel-motor driving circuit 209 causes the reel motor 208 to rotate in the arrow-A2 direction at high speed. As a result of the reel motor 208 rotating in the arrow-A2 direction at high speed, the swing gear mechanism 207 is coupled with the take-up reel 206 so that the take-up reel 206 rotates in an arrow-D1 direction at high speed, and the take-up-reel hub 205 of the tape cassette 202 rotates in the arrow-D1 direction at high speed.

When the take-up-reel hub 205 of the tape cassette 202 rotates at the arrow-D1 direction at high speed, the magnetic tape 201 is wound on the take-up-reel hub 205, and the magnetic tape 201 runs in an arrow-C2 direction at high speed. At this time, as a result of the magnetic tape 201 running in the arrow-C2 direction, the supply reel 204 is rotated in an arrow-B2 direction.

When the take-up reel 206 has rotated a predetermined number of revolutions immediately after the magnetic tape 201 starts running in the arrow-C2 direction, a diameter of the reel hubs (203, 205) is measured (in a step S1-7).

The measurement of the diameter of the reel hubs in the step S1-7 will now be described.

The diameter of the reel hubs (203, 205) is represented by 'd' (mm), a theoretically determined thickness (manufacturer's nominal value or the like) of the magnetic tape 201 is represented by '$t_0$' (mm), a number of turns of the tape 201 wound on the supply-reel hub 203 is represented by Ns, a number of turns of the tape 201 wound on the take-up-reel hub 205 is represented by Nt, a diameter of the tape-wound supply-reel hub 203 is represented by ⌀s (mm), and a diameter of the tape-wound take-up-reel hub 205 is represented by ⌀t (mm). Then, the diameter ⌀s of the tape-wound supply-reel hub 203 can be expressed as follows:

$$\varnothing s = d + 2 \cdot Ns \cdot t_0 \text{ (mm)} \tag{11}$$

The diameter ⌀t of the tape-wound take-up-reel hub 205 can be expressed as follows:

$$\varnothing t = d + 2 \cdot Nt \cdot t_0 \text{ (mm)} \tag{12}$$

When the take-up reel 206 has rotated 'A' revolutions (2 revolutions), the number Nt of turns of the tape 201 wound on the take-up-reel hub 205 is 'A' because the magnetic tape 201 was not wound on the take-up-reel hub 205 in the step S1-4. Therefore, the diameter ⌀t of the tape-wound take-up-reel hub 205 can be expressed as follows:

$$\varnothing t = d + 2 \cdot A \cdot t_0 \tag{13}$$

On the other hand, the diameter ⌀s of the tape-wound supply-reel hub 203 can be expressed as follows:

$$\varnothing s = d + 2 \cdot Nsa \cdot t_0 \tag{14}$$

In the above equation, Nsa represents a number of turns remaining on the supply-reel hub 203 at this time.

Then, a ratio ka between the diameter ⌀t of the tape-wound take-up-reel hub 205 and the diameter ⌀s of the supply-reel hub 203 can be expressed as follows:

$$\varnothing s / \varnothing t = (d + 2 \cdot Nsa \cdot t_0)/(d + 2 \cdot A \cdot t_0) = ka \tag{15}$$

From the above equation (15), the diameter 'd' of the reel hubs (203, 205) can be expressed as follows:

$$d = 2 \cdot t_0 \cdot (Nsa - A \cdot ka)/(ka - 1) \tag{16}$$

The ratio ka(=⌀s/⌀t) between the diameter ⌀t of the tape-wound take-up-reel hub 205 and the diameter ⌀s of the tape-wound supply-reel hub 203 is obtained, as will be described in a step S3-5 shown in FIG. 6, as the ratio ka(=Ts/Tt) between the rotation periods.

The number Nsa of turns of the tape 201 remaining on the supply-reel hub 203 is obtained, as will be described later, in a process for obtaining an actual thickness 't' of the magnetic tape 201. Specifically, the number Nsa of turns of the tape 201 remaining on the supply-reel hub 203 is obtained a result of the values obtained from the process described later with reference to an operation flowchart shown FIG. 6 being substituted in the equation of a step S4-1 shown in FIG. 7.

Figure 5:
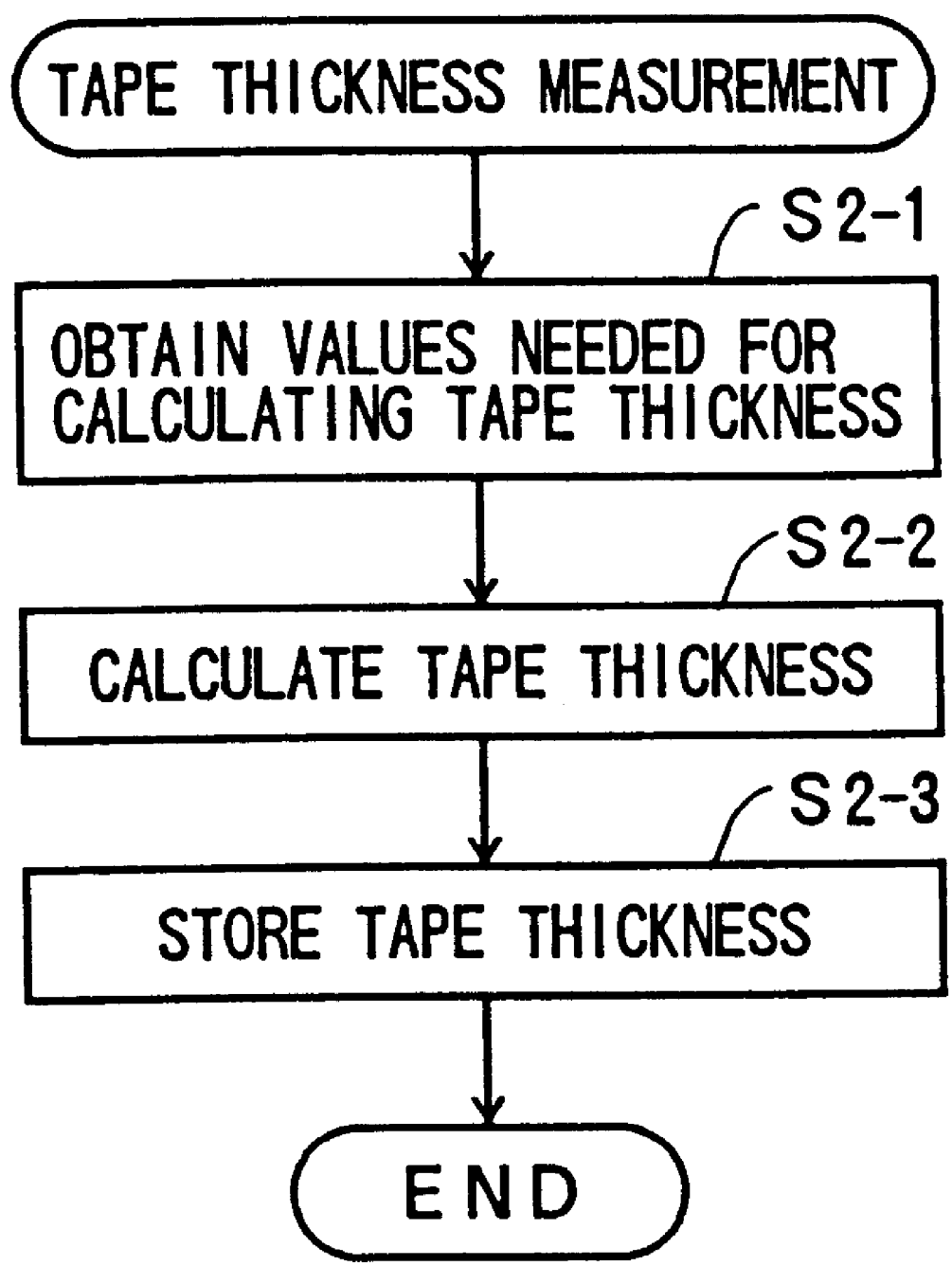
FIG. 5 shows an operation flowchart of a process of measuring a thickness of a magnetic tape performed by the tape-running control circuit in the embodiment of the present invention.

With reference to FIG. 4 again, the tape-running control circuit 210 calculates the actual thickness 't' of the magnetic tape 201, as follows:

FIG. 5 shows an operation flowchart of a tape-thickness measuring process in the embodiment of the present invention.

In the tape-thickness measuring process, as will be described later, the ratio 'ka' between the rotation periods Ts and Tt of the supply reel 204 and the take-up reel 206 when the take-up reel 206 has rotated the predetermined number 'A' of revolutions, a number 'z' of turns of the magnetic tape 201 reduced from the supply-reel hub 203 between the time when the take-up reel 206 has rotated the predetermined number 'A' of revolutions and the time when the take-up reel 206 has rotated a predetermined number (A+x) of revolutions, and a ratio 'kax' between the rotation periods Ts and Tt of the supply reel 204 and the take-up reel 206 when the take-up reel 206 has rotated the predetermined number (A+x) of revolutions are obtained (in a step S2-1). (The term 'rotation period' means the time required for one revolution of the reel, throughout the present specification.) Then, as will be described later, the actual thickness 't' of the magnetic tape 201 is calculated by using the ratio 'ka' between the rotation periods Ts and Tt of the supply reel 204 and the take-up reel 206 when the take-up reel 206 has rotated the predetermined number 'A' of revolutions, the number 'z' of turns of the magnetic tape 201 reduced from the supply-reel hub 203 between the time when the take-up reel 206 has rotated the predetermined number 'A' of revolutions and the time when the take-up reel 206 has rotated the predetermined number (A+x) of revolutions, and the ratio 'kax' between the rotation periods Ts and Tt of the supply reel 204 and the take-up reel 206 when the take-up reel 206 has rotated the predetermined number (A+x) of revolutions, obtained in the step S2-1 (in a step S2-2). The thus-calculated actual thickness 't' of the magnetic tape 201 is stored as the actual thickness 't' of the magnetic tape 201 contained in the loaded tape cassette 202 (in a step S2-3).

Figure 6:
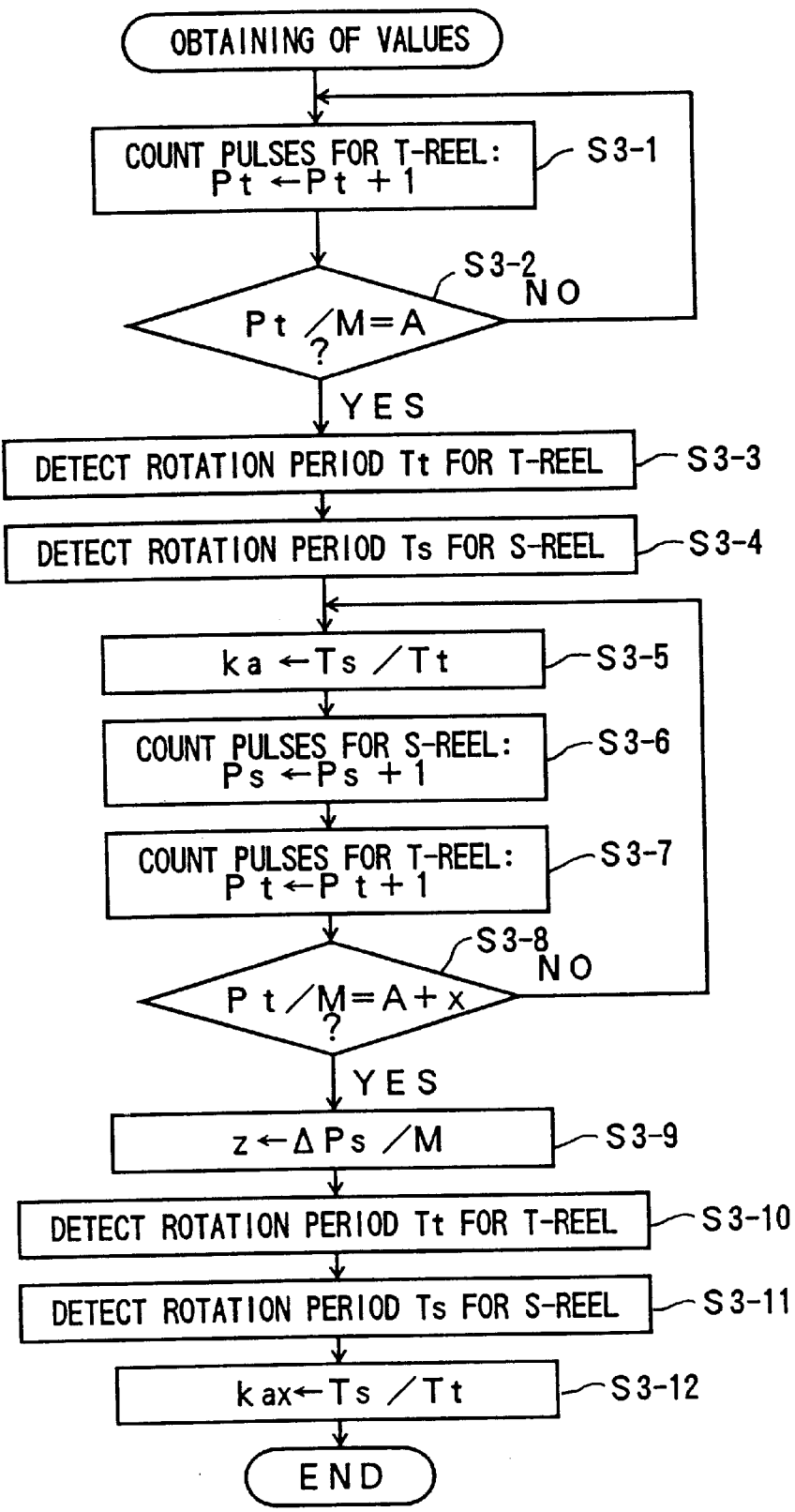
FIG. 6 shows an operation flowchart of a process of obtaining values, which are used for calculating the thickness of the magnetic tape, performed by the tape-running control circuit in the embodiment of the present invention.

A process, in the step S2-1, for obtaining the ratio 'ka' between the rotation periods Ts and Tt of the supply reel 204 and the take-up reel 206 when the take-up reel 206 has rotated the predetermined number 'A' of revolutions, the number 'z' of turns of the magnetic tape 201 reduced from the supply-reel hub 203 between the time when the take-up reel 206 has rotated the predetermined number 'A' of revolutions and the time when the take-up reel 206 has rotated the predetermined number (A+x) of revolutions, and the ratio 'kax' between the rotation periods Ts and Tt of the supply reel 204 and the take-up reel 206 when the take-up reel 206 has rotated the predetermined number (A+x) of revolutions, which are necessary for calculating the actual thickness 't' of the magnetic tape 201, will now be described with reference to FIG. 6.

FIG. 6 shows an operation flowchart of a process for obtaining the values needed for calculating the actual thickness 't' of the magnetic tape, in the embodiment of the present invention.

From the condition where all the magnetic tape 201 has been rewound on the supply-reel hub 203, rotation pulses supplied by the rotation detecting sensor 212 which detects the rotation of the take-up reel 206 are counted until the number of revolutions which the take-up reel 206 has rotated reaches a predetermined number, that is, 'A' (in steps S3-1, S3-2).

Because the rotation detecting sensor 212 generates M rotation pulses each time when the take-up reel 206 rotates one revolution, the number of revolutions which the take-up reel 206 has rotated can be obtained as a result of dividing a number Pt of rotation pulses, generated by the rotation detecting sensor 212, by M. In the step S3-2, it is determined whether the number (Pt/M) of revolutions has reached the predetermined number 'A' of revolutions.

When the number (Pt/M) of revolutions of the take-up reel 206 has reached the predetermined number 'A' of revolutions, the respective rotation periods Ts, Tt of the supply reel 204 and the take-up reel 206 are detected (in steps S3-3, S3-4). Each rotation period can be obtained by measuring the time required for generation of the M rotation pulses for the respective reel. Then, the ratio ka(=Ts/Tt) between the rotation periods Ts and Tt of the supply reel 204 and the take-up reel 206 is calculated (in a step S3-5).

Then, a number Ps of rotation pulses of the supply reel 204 and the number Pt of the rotation pulses of the take-up reel 206 are counted until the number of revolutions which the take-up reel 206 has rotated reaches (A+x) (in steps S3-6, S3-7 and S3-8).

When the number of revolutions which the take-up reel 206 has rotated reaches (A+x) in the step S3-8, the number of revolutions which the supply reel 204 has rotated after the number of revolutions which the take-up reel 206 had rotated reached 'A' is set in 'z' (in a step S3-9).

Then, the rotation periods Ts and Tt of the supply reel 204 and the take-up reel 206 when the number of revolutions which the take-up reel 206 has rotated reaches the predetermined number (A+x) of revolutions are detected (in steps S3-10, S3-11), and the ratio kax(=Ts/Tt) between the rotation periods Ts and Tt is calculated (in a step S3-12).

Actually, each ratio (ka, kax) between the rotation periods Ts and Tt is obtained as a result of obtaining a ratio between a period of the rotation pulses (the interval between a pair of successive rotation pulses) generated by the rotation detecting sensor 211 and a period of the rotation pulses generated by the rotation detecting sensor 212.

Thus, the ratio 'ka' between the rotation periods Ts and Tt of the supply reel 204 and the take-up reel 206 when the take-up reel 206 has rotated the predetermined number 'A' of revolutions, the number 'z' of turns of the magnetic tape 201 reduced from the supply-reel hub 203 between the time when the take-up reel 206 has rotated the predetermined number 'A' of revolutions and the time when the take-up reel 206 has rotated the predetermined number (A+x) of revolutions, and the ratio 'kax' between the rotation periods Ts and Tt of the supply reel 204 and the take-up reel 206 when the take-up reel 206 has rotated the predetermined number (A+x) of revolutions, which are necessary for calculating the actual thickness 't' of the magnetic tape 201, are obtained.

The process of calculating the actual thickness 't' of the magnetic tape 201 in the step S2-2, shown in FIG. 5, will now be described with reference to FIG. 7.

Figure 7:
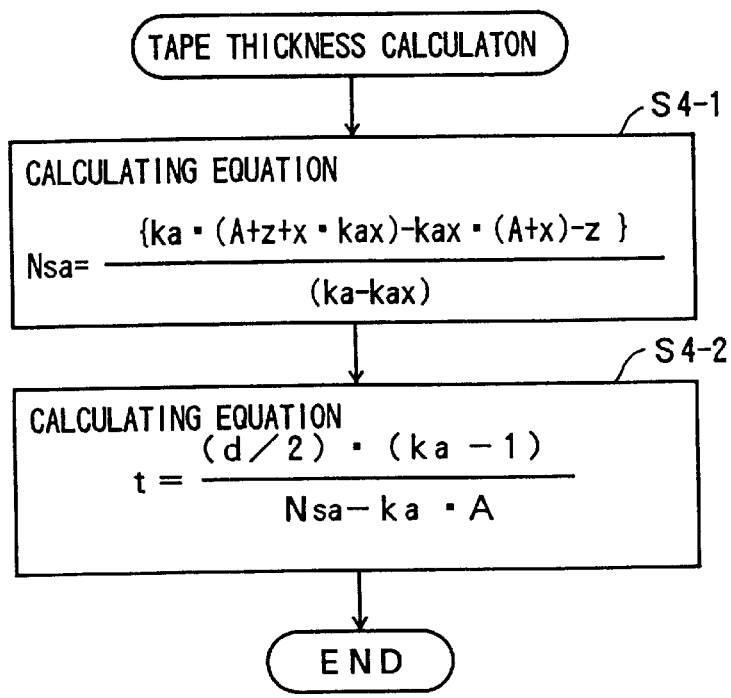
FIG. 7 shows an operation flowchart of calculating the thickness of the magnetic tape performed by the tape-running control circuit in the embodiment of the present invention.

FIG. 7 shows an operation flowchart of the process of calculating the actual thickness 't' of the magnetic tape 201 in the embodiment of the present invention.

In the tape thickness calculating process, the ratio 'ka' between the rotation periods Ts and Tt of the supply reel 204 and the take-up reel 206 when the take-up reel 206 has rotated the predetermined number 'A' of revolutions, the number 'z' of turns of the magnetic tape 201 reduced from the supply-reel hub 203 between the time when the take-up reel 206 has rotated the predetermined number 'A' of revolutions and the time when the take-up reel 206 has rotated the predetermined number (A+x) of revolutions, and the ratio 'kax' between the rotation periods Ts and Tt of the supply reel 204 and the take-up reel 206 when the take-up reel 206 has rotated the predetermined number (A+x) of revolutions, obtained in the process shown in FIG. 6, are substituted in the calculating equation of a step S4-1. Further, the predetermined numbers 'A' and 'x' of revolutions are substituted in the same calculating equation. Thus, the number Nsa of turns of the tape 201 remaining on the supply-reel hub 203 when the take-up reel 206 has rotated the predetermined number 'A' of revolutions is calculated.

Then, the diameter 'd' of reel hubs (203, 205), obtained in the step S1-7, shown in FIG. 4, in accordance with the equation (16), and the ratio 'ka' between the rotation periods Ts and Tt of the supply reel 204 and the take-up reel 206 when the take-up reel 206 has rotated the predetermined number 'A' of revolutions, obtained in the step S3-5, shown in FIG. 6, are substituted in the calculating equation of a step S4-2. Further, the predetermined number 'A' of revolutions and the number Nsa obtained in the step S4-1 are substituted in the same calculating equation. Thus, the actual thickness 't' of the magnetic tape 201 is calculated.

Thus, it is possible to easily calculate the actual thickness 't' of the magnetic tape 201 by detecting the rotation of the supply reel 204 and the rotation of the take-up reel 206 through the rotation detecting sensors 211 and 212.

Again with reference to FIG. 4, even after the actual thickness 't' of the magnetic tape 201 is obtained in the step S1-8, the magnetic tape 201 continues to be caused to run. Then, when all the magnetic tape 201 has been wound on the take-up-reel hub 205, the tape-end detecting sensor 215 detects the rear end of the magnetic tape 201 (in a step S1-9).

When the rear end of the magnetic tape 201 is detected by the tape-end detecting sensor 214 in the step S1-9, the running of the magnetic tape 201 is stopped, and the count value of the number Pt of the rotation pulses of the take-up reel 206 from the front end to the rear end of the magnetic tape 201 is detected (in a step S1-10). The thus-detected count value is divided by M, and the result of the division is stored as the number N of turns of the magnetic tape 201 wound on the take-up-reel hub 205. Then, the tape-running control circuit 210 provides instructions to the reel-motor driving circuit 209 for rewinding the magnetic tape 201, and causes the magnetic tape 201 to be rewound (in a step S1-11).

When the magnetic tape 201 has been rewound in the step S1-11, and, then, the front end of the magnetic tape 201 is detected by the tape-end detecting sensor 214 (in a step S1-12), the running of the magnetic tape 201 is stopped (in a step S1-13). Then, a predetermined total tape wound amount S, which will be described later, is calculated from the diameter 'd' of the reel hubs (203, 205) obtained in the step S1-7, the actual thickness 't' of the magnetic tape 201 obtained in the step S1-8 and the number N of turns of the magnetic tape 201 wound on the take-up-reel hub 205 obtained in the step S1-10, and is stored (in a step S1-14).

Calculation of the total tape wound amount S will now be described.

Figure 8:
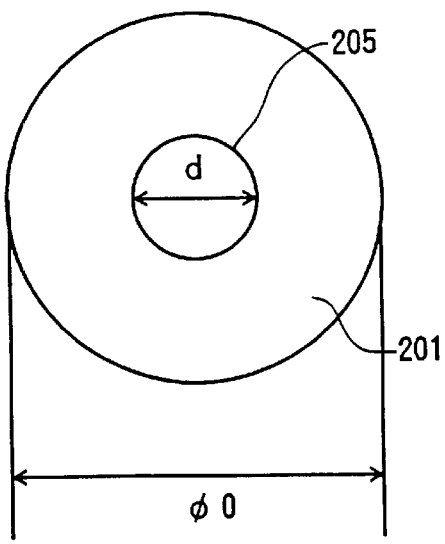
FIG. 8 illustrates a diameter of a take-up-reel hub and a diameter of a tape-wound take-up-reel hub 205 when all the magnetic tape has been wound on the take-up-reel hub.

FIG. 8 illustrates the diameter 'd' of the take-up-reel hub 205 and the diameter ø0 of the tape-wound take-up-reel hub 205 when all the magnetic tape 201 has been wound on the take-up-reel hub 205.

When the number of turns of the magnetic tape 201 wound on the take-up-reel hub 205 is N, that is, when all the magnetic tape 201 has been wound on the take-up-reel hub 205, the diameter ø0 of the tape-wound take-up-reel hub 205 is obtained by the following equation:

$$\varnothing 0 = d + 2 \cdot N \cdot t \quad (17)$$

The outer circumferential length 1k of the tape-wound take-up-reel hub 205 when the number of turns of the magnetic tape 201 wound on the take-up-reel hub 205 is k is obtained by the following equation:

$$1k = \pi \cdot (d + 2 \cdot k \cdot t) \quad (18)$$

The total length L of the magnetic tape 201 is obtained, from the above equation (18), by the following equation:

$$L = \sum_{k=1}^{N} lk = N \cdot \pi d + 2\pi \cdot t \sum_{k=1}^{N} k \quad (19)$$
$$= N(\pi \cdot d + \pi \cdot t) + N^2 \pi \cdot t$$

The total tape wound amount S is obtained by the following equation by using the diameter 'd' of the reel hubs (203, 205) obtained in the step S1-8, the actual thickness 't' of the magnetic tape 201 and the total length L of the magnetic tape 201:

$$S = t \cdot L + 2\pi d^2/4 \quad (20)$$

The tape-running control circuit 210 stores the total tape wound amount S calculated by the equation (20), and is used for controlling the reel motor 208 at the time of data recording or reproducing.

Actually, many values of the total tape wound amount S are previously calculated for possible various cases in accordance with the above-described method, and are stored in a memory. Then, when the tape cassette is loaded, an appropriate one of these many values is read from the memory in accordance with the various measured values.

Control of rotation of the reel motor 208 at the time of data recording or reproducing will now be described.

Figure 9:
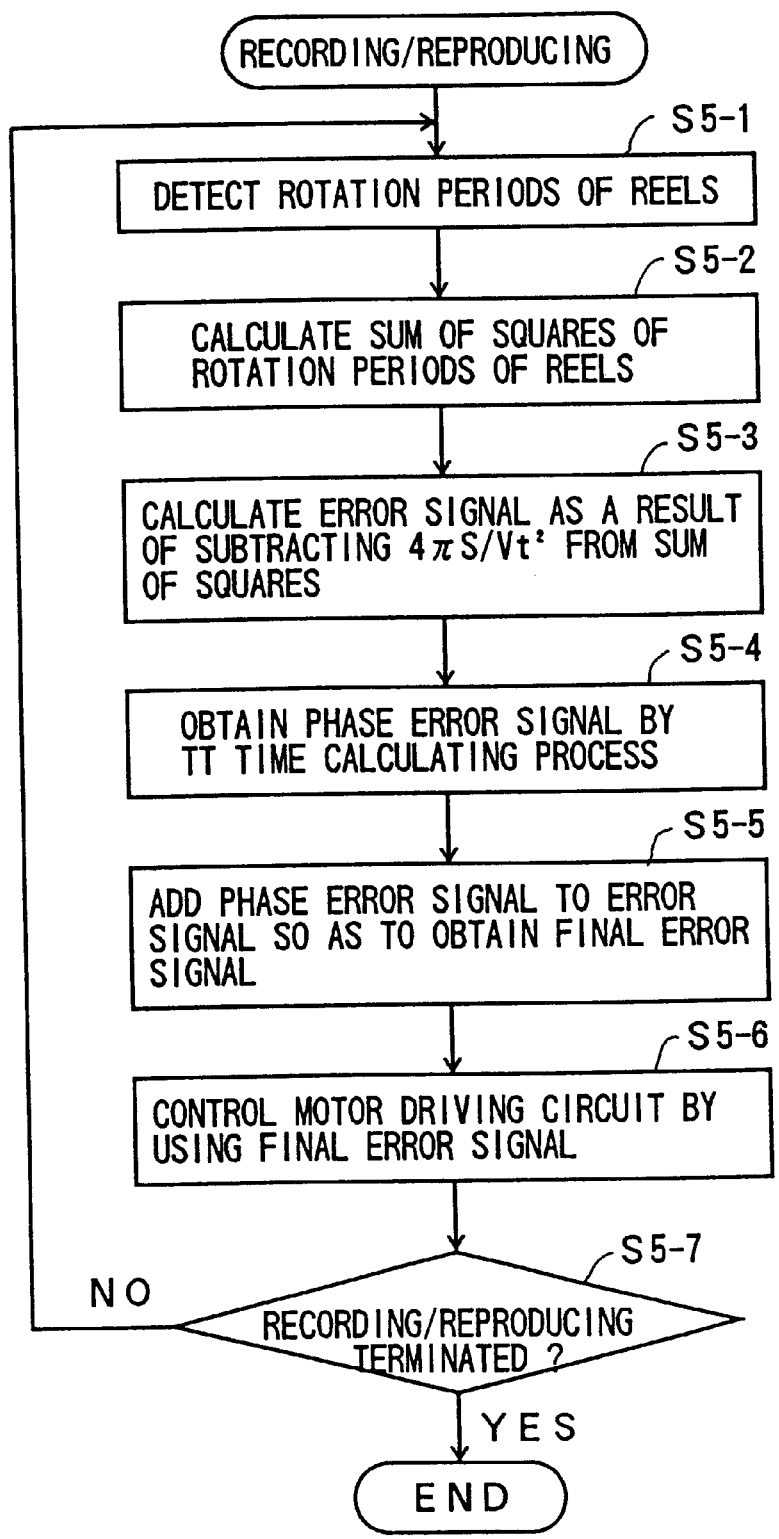
FIG. 9 shows an operation flowchart at a time of recording and reproducing performed by the tape-running control circuit in the embodiment of the present invention.

FIG. 9 shows an operation flowchart at the time of data recording or reproducing in the embodiment of the present invention.

The tape-running control circuit 210 detects the rotation periods of the supply reel 204 and the take-up reel 206 through the rotation detecting sensor 211 and the rotation detecting sensor 212 (in a step S5-1).

Then, the tape-running control circuit 210 calculates the sum of the squares of the rotation periods of the supply reel 204 and the take-up reel 206, detected in the step S5-1 (in a step S5-2).

The sum of the squares of the rotation periods Ts and Tt of the supply reel 204 and the take-up reel 206 is expressed by the following expression:

$$Ts^2 + Tt^2 \quad (21)$$

The sum of the squares of the rotation periods Ts and Tt of the supply reel 204 and the take-up reel 206 expressed by the expression (21) is constant, and the constant is expressed by a function of a tape running speed Vt and the above-mentioned total tape wound amount S, as follows:

$$Ts^2 + Tt^2 = 4 \cdot \pi \cdot S/Vt^2 \quad (22)$$

The right-hand side of the above equation (22) is easily calculated from the total tape wound amount S which is calculated when the tape cassette 202 is inserted and the constant tape running speed Vt at which the magnetic tape 201 should be caused to run.

As a result of subtracting the theoretical value $4 \cdot \pi S/Vt^2$ at the right-hand side of the above equation (22) from the sum of the squares ($Ts^2 + Tt^2$) of the rotation periods Ts and Tt of the supply reel 204 and the take-up reel 206 calculated in the step S5-2, an error signal is obtained (in a step S5-3).

It is possible that many values of this error signal are previously calculated for each value of the total tape wound amount S and for various values of the rotation periods Ts, Tt, and are stored in a memory. Then, when the tape cassette 202 is inserted, an appropriate one of the stored values may be read from the memory in accordance with the calculated total tape wound amount S and detected rotation periods Ts and Tt.

Then, a phase error signal is obtained from a reproduced signal and a rotation angle of the rotation drum 7 through a predetermined TT time calculating process (in a step S5-4). The phase error signal indicates a difference between an angle of the tracks written on the magnetic tape 201 and a scanning angle of the heads provided on the rotation drum 7.

A final error signal is obtained as a result of adding the phase error signal obtained in the step S5-4 to the error signal obtained in the step S5-3 (in a step S5-5).

By using the final error signal obtained in the step S5-5, the running control signal provided to the reel-motor driving circuit 209 is controlled (in a step S5-6). That is, the rotation speed of the take-up reel 206 is controlled so that the value of the final error signal will be zero.

During data recording or reproducing, the steps S5-1 through S5-6 are repeated (in a step S5-7). Thereby, the constant tape running speed is obtained irrespective of the diameters of the tape-wound reel hubs (203, 205).

In the embodiment, when the tape cassette 202 is inserted, rewinding and fast feeding of the magnetic tape 201 are performed, and, thereby, the total tape wound amount S is detected. Several minutes are required for these operations. However, in such a DDS system, several tens of minutes are required for starting up the system when a tape cassette is loaded. Therefore, the fact that several minutes are required for the above-mentioned operations does not cause any problem.

Further, although the embodiment is the DDS system, a system which the present invention can be applied to is not limited to the DDS system. The present invention can be applied to a system such as a DAT in which a tape is caused to run at a desired speed.

Further, the present invention is not limited to the above-described embodiment, but variations and modifications may be made without departing from the scope of the present invention.

The contents of the basic Japanese Patent Application No. 9-346786, filed on Dec. 16, 1997, are hereby incorporated by reference.

What is claimed is:

1. A tape running control method used in a tape running apparatus in which a tape runs between a supply reel and a take-up reel, wherein a rotational speed of said take-up reel and therefore the running speed of said tape are controlled by using rotation periods of said supply reel and said take-up reel, said method comprising the steps of:
    measuring a thickness of said tape;
    calculating a predetermined total tape wound amount by using the detected thickness of said tape; and
    controlling the rotation speed of said take-up reel by using the thus-calculated total tape wound amount.

2. The tape running control method as claimed in claim 1, wherein said step of measuring the thickness of said tape comprises the steps of:
    detecting said rotation periods of said supply reel and said take-up reel when said take-up reel has rotated predetermined numbers of revolutions;
    calculating a number of turns of said tape remaining on said supply reel by using the thus-detected rotation periods; and
    calculating the thickness of said tape by using the thus-calculated number of turns of said tape remaining on said supply reel.

3. A tape running control method in which a tape runs between a supply-reel and a take-up reel, and a rotation speed of said take-up reel is controlled by using rotations periods of said supply reel and said take-up reel, thereby a running speed of said tape being controlled, said method comprising the steps of:

detecting a thickness of said tape, further comprising the steps of:

detecting rotation periods of said supply reel and said take-up reel when said take-up reel has rotated predetermined numbers of revolutions;

calculating a number of turns of said tape remaining on said supply reel by using the thus-detected rotation periods calculating the thickness of said tape by using the thus-calculated number of turns of said tape remaining on said supply reel;

calculating a ratio between rotation periods of said supply reel and said take-up reel detected when said take-up reel has rotated a predetermined first number of revolutions;

calculating a ratio between rotation periods of said supply reel and said take-up reel detected when said take-up reel has rotated a predetermined second number of revolutions;

obtaining a difference between a number of revolutions which said supply reel has rotated when said take-up reel has rotated said predetermined first number of revolutions and a number of revolutions which said supply reel has rotated when said take-up reel has rotated said predetermined second number of revolutions;

calculating the number of turns of said tape remaining on said supply reel by using the thus-calculated ratios between the rotation periods and the thus-obtained difference; and calculating the thickness of said tape by using the thus-calculated number of turns of said tape remaining on said supply reel; and calculating a predetermined total tape wound amount by using the detected thickness of said tape; and controlling the rotation speed of said take-up reel by using the thus-calculated total tape wound amount.

\* \* \* \* \*